US012657054B2

(12) United States Patent (10) Patent No.: US 12,657,054 B2
Ji et al. (45) Date of Patent: Jun. 16, 2026

(54) METADATA PROCESSING METHOD BASED ON FEDERATED COMPUTING, ELECTRONIC DEVICE AND STORAGE MEDIUM

(71) Applicant: BAIDU ONLINE NETWORK TECHNOLOGY (BEIJING) CO., LTD., Beijing (CN)

(72) Inventors: Shilei Ji, Beijing (CN); Yuan Liao, Beijing (CN); Haiping Huang, Beijing (CN); Ji Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 757 days.

(21) Appl. No.: 18/012,967

(22) PCT Filed: Nov. 12, 2021

(86) PCT No.: PCT/CN2021/130307
§ 371 (c)(1),
(2) Date: Dec. 26, 2022

(87) PCT Pub. No.: WO2022/262183
PCT Pub. Date: Dec. 22, 2022

(65) Prior Publication Data
US 2023/0251898 A1 Aug. 10, 2023

(30) Foreign Application Priority Data
Jun. 18, 2021 (CN) .......................... 202110677839.0

(51) Int. Cl.
*G06F 9/48* (2006.01)

(52) U.S. Cl.
CPC .................................. *G06F 9/4881* (2013.01)

(58) Field of Classification Search
CPC ....................................................... G06F 9/4881
See application file for complete search history.

(56) References Cited

U.S. PATENT DOCUMENTS

2012/0008769 A1* 1/2012 Collins .................... G06F 21/32
726/6
2019/0122141 A1 4/2019 Zhen et al.
2020/0319922 A1* 10/2020 Cui ........................ G06F 9/5011

FOREIGN PATENT DOCUMENTS

CN 111898137 A 11/2020
CN 111914038 A 11/2020
(Continued)

OTHER PUBLICATIONS

International Search Report for PCT/CN2021/130307, dated Mar. 15, 2022, 10 pages.
(Continued)

*Primary Examiner* — Wissam Rashid
(74) *Attorney, Agent, or Firm* — Lippes Mathias LLP

(57) ABSTRACT

A federated computing method, an electronic device and a storage medium. Metadata to be processed is obtained from each participant based on a task identifier (ID) to be executed. n data slices corresponding to each participant are obtained by dividing the metadata, where n is a positive integer greater than 1. n data sets are generated based on the n data slices corresponding to each participant. n data processing services corresponding to the task ID are called to process each data set using each of the data processing services. A federated computing result corresponding to the task ID is determined based on a processing result of each of the data processing services.

20 Claims, 7 Drawing Sheets

(56)    References Cited

FOREIGN PATENT DOCUMENTS

| | | | |
|---|---|---|---|
| CN | 112148437 | A | 12/2020 |
| CN | 112200713 | A | 1/2021 |
| CN | 112860970 | A | 5/2021 |
| CN | 113537508 | A | 10/2021 |
| JP | 2008538247 | A | 10/2008 |
| JP | 2021056995 | A | 4/2021 |
| KR | 20210036881 | A | 4/2021 |
| KR | 20210040883 | A | 4/2021 |
| KR | 20210052404 | A | 5/2021 |
| WO | 2021056043 | A1 | 4/2021 |
| WO | 2021064737 | A1 | 4/2021 |

OTHER PUBLICATIONS

Joost Verbraeken et al., "A Survey On Distributed Maching Learning", ACM Computing Surveys, vol. 53, No. 2, Article 30, Publication Date: Mar. 31, 2020.
Ji Liu et al., "From Distributed Machine Learning to Federated Learning: A Survey", May 10, 2021.
Search Report for European Application No. 21945762.9,dated Dec. 5, 2023, 14 pages.
Office Action for Japanese Patent Application No. 2022-58165, dated Jan. 9, 2024, 15 pages.
Office Action for Chinese Patent Application No. 202110677839.9, dated Jun. 27, 2023, 18 pages.
Office Action for Korean Patent Application No. 10-2022-7045230, dated Jan. 21, 2025, 12 pages.
Notice of Allowance for KR application 10-2022-7045230 dated Sep. 19, 2025.

* cited by examiner

| obtaining metadata to be processed from each participant based on a task ID to be executed |
|---|

101

| obtaining n data slices corresponding to each participant by dividing the metadata |
|---|

102

| generating n data sets based on the n data slices corresponding to each participant |
|---|

103

| calling n data processing services corresponding to the task ID to process each data set using each of the data processing services |
|---|

104

| determining a federated computing result corresponding to the task ID based on a processing result of each of the data processing services |
|---|

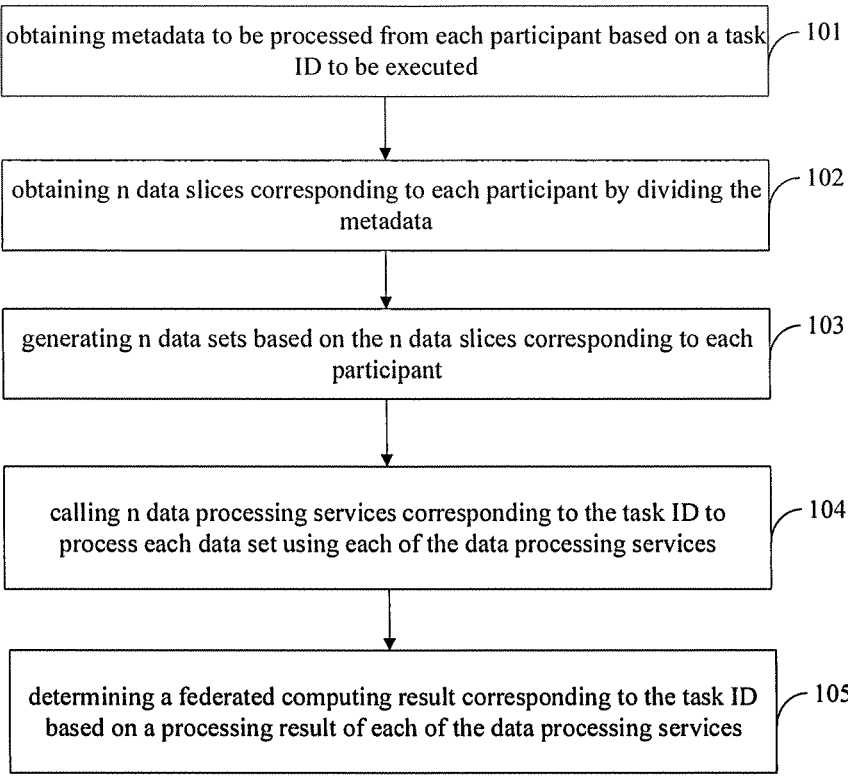

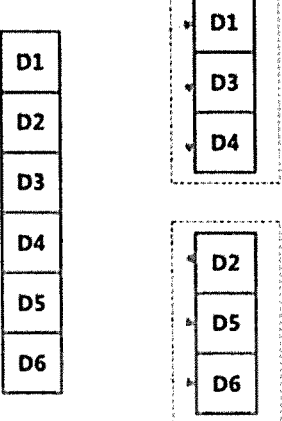

FIG. 2

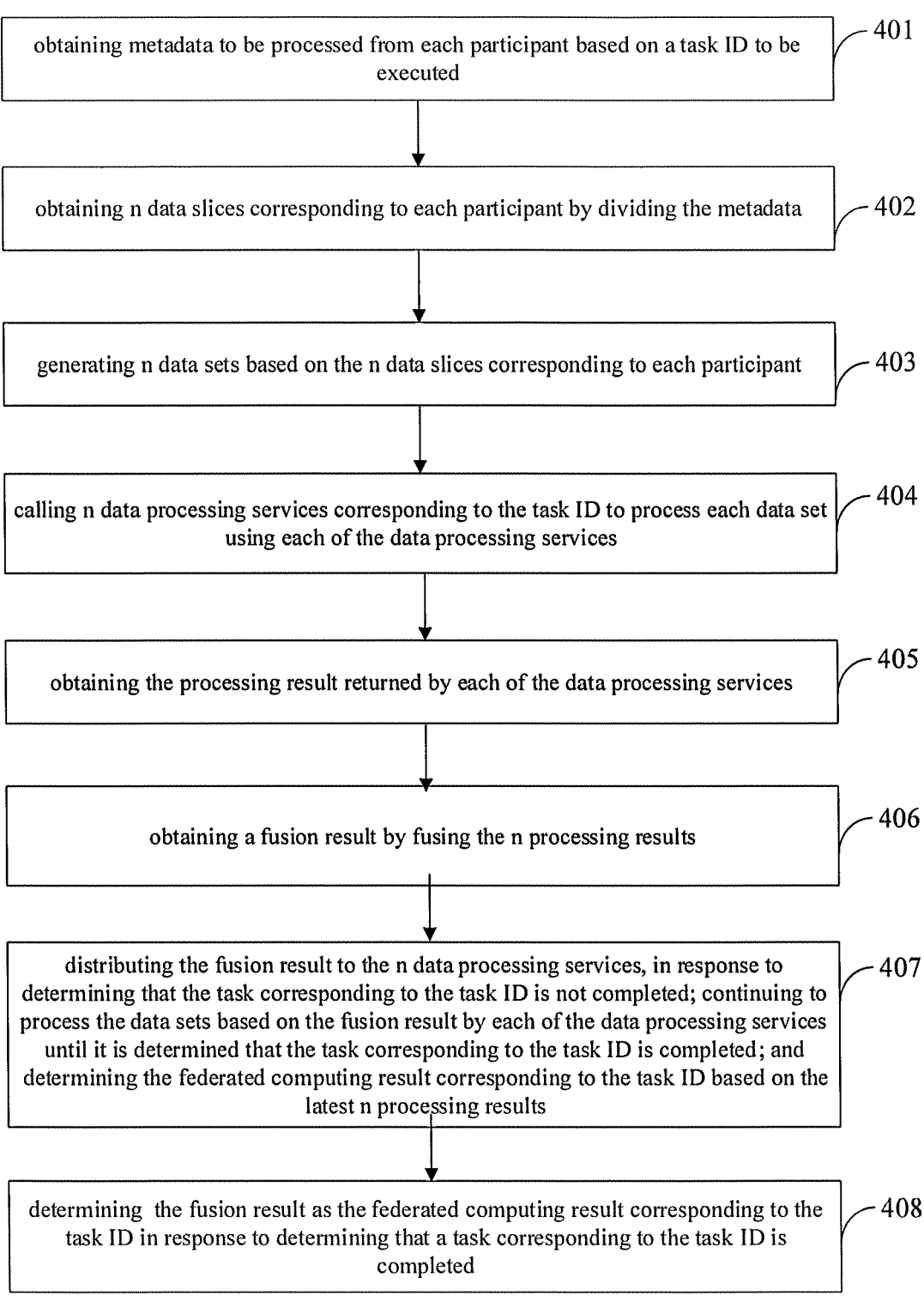

obtaining metadata to be processed from each participant based on a task ID to be executed ⟋401 obtaining n data slices corresponding to each participant by dividing the metadata ⟋402 generating n data sets based on the n data slices corresponding to each participant ⟋403 calling n data processing services corresponding to the task ID to process each data set using each of the data processing services ⟋404 obtaining the processing result returned by each of the data processing services ⟋405 obtaining a fusion result by fusing the n processing results ⟋406 distributing the fusion result to the n data processing services, in response to determining that the task corresponding to the task ID is not completed; continuing to process the data sets based on the fusion result by each of the data processing services until it is determined that the task corresponding to the task ID is completed; and determining the federated computing result corresponding to the task ID based on the latest n processing results ⟋407 determining the fusion result as the federated computing result corresponding to the task ID in response to determining that a task corresponding to the task ID is completed ⟋408

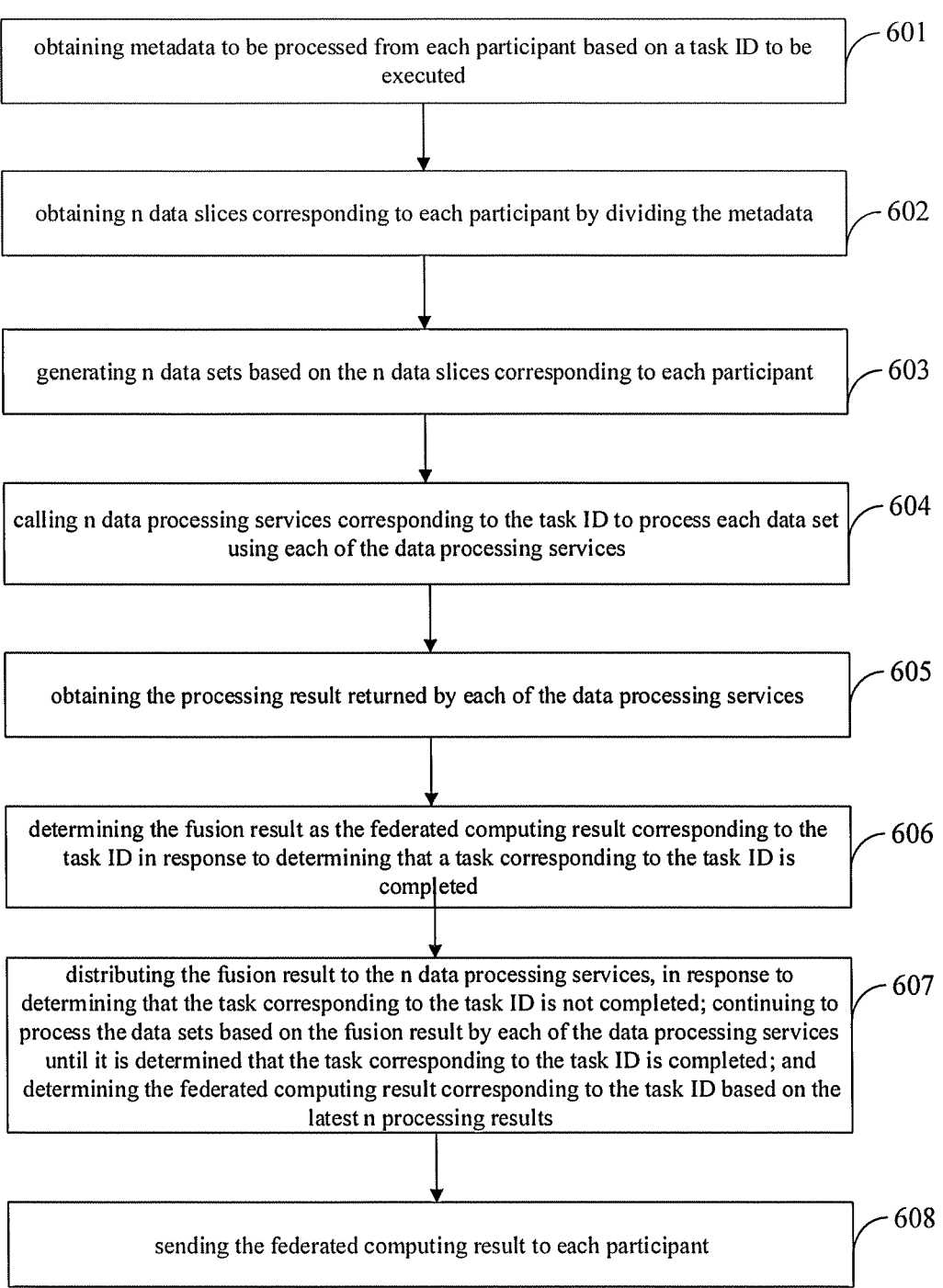

obtaining metadata to be processed from each participant based on a task ID to be executed — 601 obtaining n data slices corresponding to each participant by dividing the metadata — 602 generating n data sets based on the n data slices corresponding to each participant — 603 calling n data processing services corresponding to the task ID to process each data set using each of the data processing services — 604 obtaining the processing result returned by each of the data processing services — 605 determining the fusion result as the federated computing result corresponding to the task ID in response to determining that a task corresponding to the task ID is completed — 606 distributing the fusion result to the n data processing services, in response to determining that the task corresponding to the task ID is not completed; continuing to process the data sets based on the fusion result by each of the data processing services until it is determined that the task corresponding to the task ID is completed; and determining the federated computing result corresponding to the task ID based on the latest n processing results — 607 sending the federated computing result to each participant — 608

FIG. 6

METADATA PROCESSING METHOD BASED ON FEDERATED COMPUTING, ELECTRONIC DEVICE AND STORAGE MEDIUM

CROSS-REFERENCE TO RELATED APPLICATIONS

This application claims priority to Chinese Patent Application No. 202110677839.9, filed by Baidu Online Network Technology (Beijing) Co., Ltd., on Jun. 18, 2021, titled "Federated Computing Method and Apparatus, Electronic Device and Storage Medium".

TECHNICAL FIELD

The disclosure relates to the field of artificial intelligence (AI) technology, especially the field of big data, cloud computing and deep learning technology, in particular to a federated computing method, an electronic device and a storage medium.

BACKGROUND

Federated computing refers to the use of multi-party computing (MPC), trusted execution environment (TEE), federated learning (FL) and other privacy security technologies, to provide a data analysis environment which is available to but not disclosed to multi-party data security cooperation, which has an important impact on the privacy and security of data in the process of circulation.

How to improve the performance of federated computing is a problem to be solved urgently.

SUMMARY

The disclosure provides a federated computing method, an electronic device and a storage medium.

According to a first aspect of the disclosure, a federated computing method is provided. The method includes:

obtaining metadata to be processed from each participant based on a task identifier (ID) to be executed;

obtaining n data slices corresponding to each participant by dividing the metadata, in which n is a positive integer greater than 1;

generating n data sets based on the n data slices corresponding to each participant;

calling n data processing services corresponding to the task ID to process each data set using each of the data processing services; and determining a federated computing result corresponding to the task ID based on a processing result of each of the data processing services.

According to a second aspect of the disclosure, an electronic device is provided. The electronic device includes: at least one processor and a memory communicatively coupled to the at least one processor. The memory stores instructions executable by the at least one processor, and when the instructions are executed by the at least one processor, the federated computing method of the first aspect of the disclosure is implemented.

According to a third aspect of the disclosure, a non-transitory computer-readable storage medium having computer instructions stored thereon is provided. The computer instructions are configured to cause a computer to implement the federated computing method of the first aspect of the disclosure.

According to a fourth aspect of the disclosure, a computer program product including computer programs is provided. When the computer programs are executed by a processor, the federated computing method of the first aspect of the disclosure is implemented.

It should be understood that the content described in this section is not intended to identify key or important features of the embodiments of the disclosure, nor is it intended to limit the scope of the disclosure. Additional features of the disclosure will be easily understood based on the following description.

BRIEF DESCRIPTION OF THE DRAWINGS

The drawings are used to better understand the solution and do not constitute a limitation to the disclosure, in which:

FIG. 1 is a flowchart of a federated computing method according to the embodiments of the disclosure.

FIG. 2 is a schematic diagram of hash bucket data dividing according to the embodiments of the disclosure.

FIG. 4 is a flowchart of another federated computing method according to the embodiments of the disclosure.

FIG. 6 is a flowchart of yet another federated computing method according to the embodiments of the disclosure.

DETAILED DESCRIPTION

Figure 3:
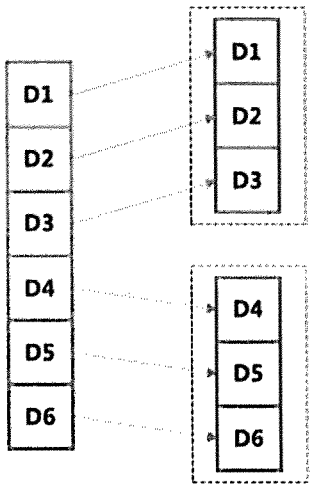
FIG. 3 is a schematic diagram of sequence bucket data dividing according to the embodiments of the disclosure.

The following describes the exemplary embodiments of the disclosure with reference to the accompanying drawings, which includes various details of the embodiments of the disclosure to facilitate understanding, which shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

A federated computing method, a federated computing apparatus, an electronic device, and a storage medium according to the embodiments of the disclosure are described below with reference to the accompanying drawings.

AI is a subject that studies the use of computers to simulate certain human thinking processes and intelligent behaviors (such as learning, reasoning, thinking and planning), which has both the hardware-level technology and the software-level technology. AI hardware technology generally includes technologies such as sensor, special AI chip, cloud computing, distributed storage and big data processing. AI software technology mainly includes computer vision, speech recognition technology, natural language processing technology and machine learning/deep learning, big data processing technology and knowledge map technology.

Cloud computing refers to a technology system that can access an elastic and scalable shared physical or virtual resource pool through the network. Resources include servers, operating systems, networks, software, applications and storage devices, and the technology system can deploy and manage resources in an on-demand and self-service manner. Through cloud computing technology, efficient and powerful data processing capabilities may be provided for AI, block-chain and other technology applications and model training.

The following describes the federated computing method in detail according to the disclosure in combination with the embodiments of the disclosure. The execution subject of the federated computing method of the disclosure is a federated computing platform.

FIG. 1 is a flowchart of a federated computing method according to the embodiments of the disclosure.

As illustrated in FIG. 1, the federated computing method includes the following steps.

In S101, metadata to be processed is obtained from each participant based on a task ID to be executed.

The task ID to be executed can be any ID that can uniquely identify a federated computing task.

In the disclosure, the federated computing platform can first determine the task ID to be executed, and then obtain the metadata related to the task ID to be executed from each participant.

For example, the task to be performed by the federated computing platform is a speech recognition model, and participants include A and B. The metadata related to the speech recognition model in participant A is a, and the metadata related to the speech recognition model in participant B is b. Thus, the federated computing platform can obtain the metadata a from participant A and the metadata b from participant B.

It is understandable that the metadata obtained by the federated computing platform from each participant is the intermediary data related to the task to be executed, that is, the metadata can describe the features of each participant's owned data and is used for federated computing tasks such as model training, but it is not the owned data itself.

In S102, n data slices corresponding to each participant are obtained by dividing the metadata.

Optionally, the data dividing mode can be determined according to the task ID to be executed. The data dividing mode can include hash bucket dividing and sequence bucket dividing.

After determining the data dividing mode, the metadata can be divided based on the data dividing mode, to obtain the n data slices corresponding to each participant, where n is a positive integer greater than 1.

It should be noted that different dividing modes can be configured for different types of task IDs as required. For example, the advantage of hash bucket dividing is that it can find and insert data very quickly and reduce the consumption of space. Therefore, the hash bucket dividing can be used for security encryption, unique identification, data verification, hash function, load balancing (such as consistent hash) or distributed caching. In particular, in a scene where the data volumes of two participants are different, for example, PSI (privacy data intersection) algorithm must adopt the hash bucket dividing. The advantage of sequence bucket dividing lies in the high efficiency and stability of data dividing. Therefore, when the data sequence is relatively uniform, sequence bucket dividing can be used.

In combination with FIG. 2, the hash bucket data dividing is described in detail. FIG. 2 is a schematic diagram of hash bucket data dividing according to the embodiments of the disclosure.

As illustrated in FIG. 2, the metadata to be processed can be {D1, D2, D3, D4, D5, D6}, the metadata to be processed can be divided by hash bucket, and the data dividing result can be {[D1, D3, D4], [D2, D5, D6]}. That is, the metadata to be processed is divided into two smaller data slices, and since the hash bucket dividing is to calculate the hash values according to the unique ID value of each data and put it into the corresponding bucket, the obtained data dividing result is not divided according to the sequence of the metadata to be processed.

The sequence bucket data dividing is described in detail below in combination with FIG. 3. FIG. 3 is a schematic diagram of sequence bucket data dividing according to the embodiments of the disclosure.

As illustrated in FIG. 3, the metadata to be processed can be {D1, D2, D3, D4, D5, D6}. The metadata to be processed is subjected to sequence bucket data dividing, and the data dividing result can be {[D1, D2, D3], [D4, D5, D6]}. It can be seen that sequence bucket dividing refers to putting the data into each bucket evenly in sequence.

It should be noted that the above process of dividing the data of each participant into the n data slices can also be performed by each participant separately. That is, each participant determines the metadata to be processed based on the task ID to be executed. After determining the metadata to be processed, each participant divides its own metadata to obtain the n data slices corresponding to each participant. After that, each participant can synchronize the n data slices after dividing to the federated computing platform.

In S103, n data sets are generated based on the n data slices corresponding to each participant.

In the disclosure, the executive body of the disclosure can combine the n data slices of each participant, and then combine with n data slices corresponding to other participants respectively to generate the n data sets.

It is understood that each data set includes a data slice for each participant.

In S104, n data processing services corresponding to the task ID are called to process each data set using each of the data processing services.

In this disclosure, after the n data sets corresponding to the task ID to be executed are generated, n threads can be called to run the n data processing services to process each data set respectively, thereby greatly improving the speed of federated computing.

In S105, a federated computing result corresponding to the task ID is determined based on a processing result of each of the data processing services.

In detail, since each data set includes a data slice of each participant, that is, according to the processing result obtained from each data set, it can be considered that a result is obtained by federated computing based on a small amount of federated data, and then the processing results are fused to obtain the computing results of a full amount of federated data after federated computing.

Optionally, the processing results of multiple data processing services can be averaged to obtain the federated computing result, or the processing results of multiple data processing services can be weighted and fused to obtain the federated computing result, which is not limited in the disclosure.

Optionally, after determining the federated computing result corresponding to the task ID, the federated computing result can also be sent to each participant.

In the embodiment of the disclosure, the metadata to be processed is obtained from each participant based on the task ID to be executed. The n data slices corresponding to each participant are obtained by dividing the metadata. The n data sets are generated based on the n data slices corresponding to each participant. The n data processing services corresponding to the task ID are called to process each data set using each of the data processing services. Finally, the federated computing result corresponding to the task ID is determined based on the processing result of each of the data processing services. Therefore, in the federated computing process, the parallelization of FL is realized by using data parallelism, which greatly improves the speed of federated computing and provides technical feasibility for the use of large-scale data privacy computing.

It can be seen from the above analysis that in the disclosure, the federated computing result corresponding to the task ID can be determined according to the processing result of each data processing service. In a possible implementation, the process of federated computing may require multiple rounds of iterative updates. Therefore, in the disclosure, it is possible to determine whether the task corresponding to the task ID is completed according to the convergence conditions corresponding to the task ID after obtaining the federated computing result each time, so as to determine whether to continue the federated computing. The above situation will be described below in combination with FIG. 4. FIG. 4 is a flowchart of another federated computing method according to the embodiments of the disclosure.

As illustrated in FIG. 4, the federated computing method includes the following steps.

In S401, metadata to be processed is obtained from each participant based on a task ID to be executed.

In S402, n data slices corresponding to each participant are obtained by dividing the metadata, where n is a positive integer greater than 1.

In S403, n data sets are generated based on the n data slices corresponding to each participant.

In S404, n data processing services corresponding to the task ID are called to process each data set using each of the data processing services.

In the disclosure, the specific implementation of steps 401-404 can refer to the detailed description of other embodiments in the disclosure, and will not be repeated here.

In S405, the processing result returned by each of the data processing services is obtained.

In S406, a fusion result is obtained by fusing the n processing results.

Figure 5:
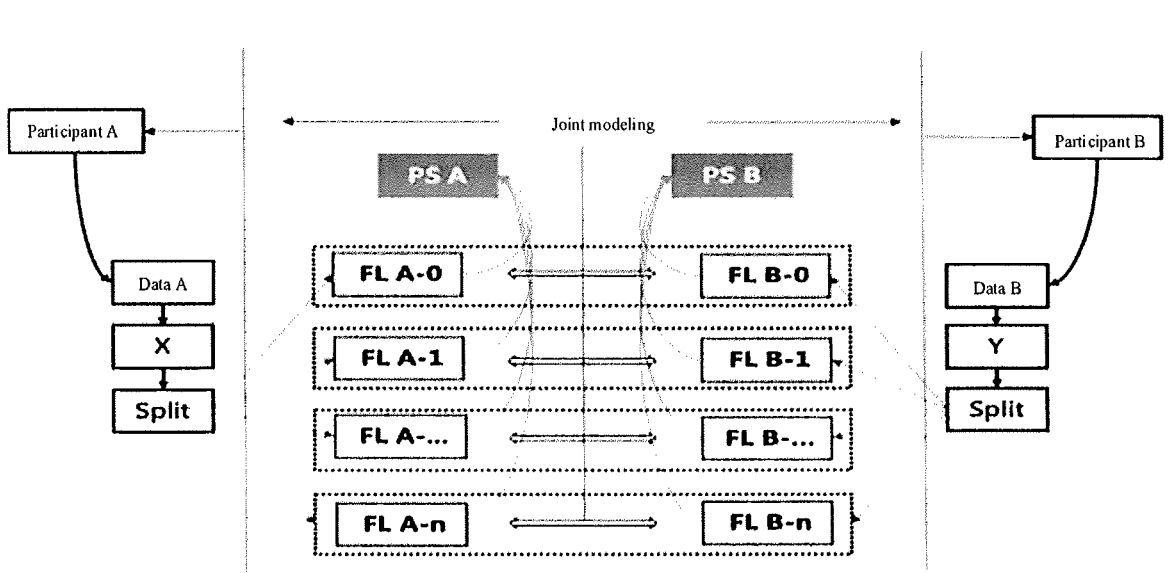
FIG. 5 is a schematic diagram of a federated computing platform according to the embodiments of the disclosure.

In the disclosure, the federated computing platform may adopt the architecture shown in FIG. 5. FIG. 5 is a schematic diagram of a federated computing platform according to the embodiments of the disclosure.

In FIG. 5, taking participant A and participant B as examples, as shown in FIG. 5, the metadata to be processed corresponding to participant A is X, and the metadata to be processed corresponding to participant B is Y. After obtaining X from participant A and Y from participant B, the execution subject can call a data splitting program to perform data splitting on X and Y based on the task ID to be executed. The splitting program is a program that can split a large file into many small files. The splitting program divides X and Y into smaller data slices. For example, after dividing X and Y respectively, n data slices corresponding to participant A and participant B are obtained, such as FLA-0, FLA-1, FLA- . . . , FLA-n, FLB-0, FLB-1, FLB- . . . , FLB-n in FIG. 5. Then, the first data slice in participant A and the first data slice in participant B are combined to obtain a data set, and the above method is repeated until all the data slices in participant A and participant B are combined to generate n data sets (FLA-0, FLB-0), (FLA-1, FLB-1), (FLA- . . . , FLB- . . . ), (FLA-n, FLB-n).

After obtaining the n data sets, n data processing services corresponding to the task ID can be called to process each data set using each of the data processing services. Finally, each data processing service can send the processing results to a data fusion service, such as PSA and PSB in FIG. 5. PSA and PSB fuse the processing results of each data processing service to generate the federated computing result corresponding to the task ID.

In the disclosure, after each data processing service is used to process each data set to obtain the n processing results, a corresponding data aggregator can be called to fuse the n processing results to obtain the fusion result.

It can be understood that, in order to avoid endless circulation of federated computing tasks, the federated computing platform in the disclosure can set certain task end conditions for each federated computing task, so as to minimize the number of invalid calculations while ensuring that the federated computing result is accurate enough. The task end conditions can be set according to needs, such as the number of calculations, and the accuracy of calculation results, which are not limited in the disclosure.

In the disclosure, after determining the fusion result after each federated computing, whether the task end conditions are satisfied can be determined. For example, whether the task end conditions are satisfied can be determined according to the number of federated computing that has been executed. Alternatively, it is also possible to determine whether the task end conditions are satisfied according to the difference between the current fusion result and the previous fusion result, which is not limited in the disclosure.

In S407, the fusion result is distributed to the n data processing services, in response to determining that the task corresponding to the task ID is not completed. The data sets are process continuously based on the fusion result by each of the data processing services until it is determined that the task corresponding to the task ID is completed. The federated computing result corresponding to the task ID is determined based on the latest n processing results.

In the disclosure, it is possible to first determine whether the task corresponding to the task ID is completed. When it is determined that the task corresponding to the task ID is not completed, the fusion result can be distributed to the n data processing services. After receiving the fusion result, each data processing service can continue to process the corresponding data set based on the fusion result until it is determined that the task corresponding to the task ID is completed. Then, according to the latest n processing results, the federated computing result corresponding to the task ID can be determined.

In S408, the fusion result is determined as the federated computing result corresponding to the task ID in response to determining that a task corresponding to the task ID is completed.

In the disclosure, when it is determined that the task corresponding to the task ID is completed, the fusion result obtained after the task corresponding to the task ID is completed can be determined as the federated computing result corresponding to the task ID.

For example, the task corresponding to the task ID can be a face recognition training model, and the training time is k. Then the federated computing platform can determine whether the number of federated computing that has been executed reaches k after each fusion result is obtained. If not, it is determined that the task is not completed, otherwise, it is determined that the task is completed.

In the embodiment of the disclosure, after each data set is processed by each data processing service, the processing result returned by each data processing service can be obtained, and the n processing results can be fused to obtain the fusion result. When it is determined that the task corresponding to the task ID is not completed, the fusion result can be distributed to the n data processing services, so that each data processing service can continue to process the corresponding data set based on the fusion result until it is determined that the task corresponding to the task ID is completed. According to the latest n processing results, the federated computing result corresponding to the task ID is obtained. When it is determined that the task corresponding to the task ID is completed, the fusion result is determined as the federated computing result corresponding to the task ID. Therefore, by setting the end for the federated computing task, the situation of invalid calculation of the task is avoided as far as possible, and the speed of federated computing is further improved, while ensuring the accuracy of the final federated computing result.

The following is explained in combination with FIG. 6, FIG. 6 is a flowchart of yet another federated computing method according to the embodiments of the disclosure.

As illustrated in FIG. 6, the federated computing method includes the following steps.

In S601, metadata to be processed is obtained from each participant based on a task ID to be executed.

In S602, n data slices corresponding to each participant are obtained by dividing the metadata, where n is a positive integer greater than 1.

In S603, n data sets are generated based on the n data slices corresponding to each participant.

In S604, n data processing services corresponding to the task ID are called to process each data set using each of the data processing services.

In the disclosure, the specific implementation of steps 601-604 can refer to the detailed description of other embodiments in the disclosure, and will not be repeated here.

In S605, the fusion result returned by any data processing service is obtained, where the fusion result is generated after any data processing service fuses the processing results of each data processing service.

Figure 7:
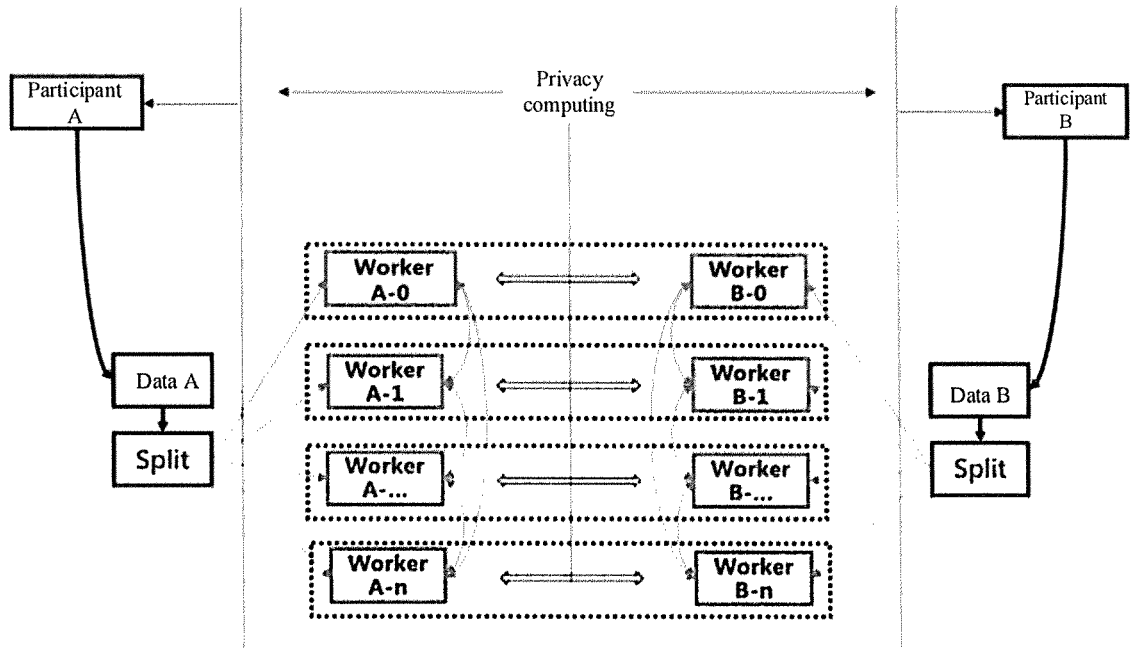
FIG. 7 is a schematic diagram of another federated computing platform according to the embodiments of the disclosure.

In the disclosure, the federated computing platform may adopt the architecture shown in FIG. 7. FIG. 7 is a schematic diagram of another federated computing platform according to the embodiments of the disclosure.

In FIG. 7, taking participant A and participant B as examples, as shown in FIG. 7, the metadata to be processed corresponding to participant A is data A, and the metadata to be processed corresponding to participant B is data B. After obtaining data A from participant A and data B from participant B, the execution subject can call a data splitting program to perform data splitting on data A and data B based on the task ID to be executed. The splitting program is a program that can split a large file into many small files. The splitting program divides data A and data B into smaller data slices, thus n data slices corresponding to participant A and participant B are obtained, such as WorkerA-0, WorkerA-1, WorkerA- . . . , WorkerA-n, WorkerB-0, WorkerB-1, WorkerB- . . . , WorkerB-n in FIG. 7. Then, the first data slice in participant A and the first data slice in participant B are combined to obtain a data set, and the above method is repeated until all the data slices in participant A and participant B are combined to generate n data sets, i.e, (WorkerA-0, WorkerB-0), (WorkerA-1, WorkerB-1), (WorkerA- . . . , WorkerB- . . . ), (WorkerA-n, WorkerB-n).

After obtaining the n data sets, the n data processing services corresponding to the task ID can be called to process each data set using each of the data processing services. In the process that the data processing service processes each data set, after each data processing service obtains a data processing result, the processing result are synchronized to other data processing services, so that each data processing service can update its own processing result based on multiple processing results to obtain the fused processing result. Finally, according to the updated processing results of each data processing service, the federated computing result corresponding to the task ID is determined.

In S606, the fusion result is determined as the federated computing result corresponding to the task ID in response to determining that a task corresponding to the task ID is completed.

In S607, the fusion result is distributed to the n data processing services, in response to determining that the task corresponding to the task ID is not completed. The data sets are processed continuously based on the fusion result by each of the data processing services until it is determined that the task corresponding to the task ID is completed. The federated computing result corresponding to the task ID is determined based on the latest n processing results.

In the disclosure, it is possible to first determine whether the task corresponding to the task ID is completed. When it is determined that the task corresponding to the task ID is not completed, the fusion result can be sent to any data processing service. After receiving the fusion result, the data processing service can continue to process the corresponding data set based on the fusion result until it is determined that the task corresponding to the task ID is completed. The execution subject of the disclosure can determine the federated computing result corresponding to the task ID based on the latest fusion result after the task corresponding to the task ID is completed.

In S608, the federated computing result is sent to each participant.

In the embodiment of the disclosure, after each data set is processed by each data processing service, the fusion result returned by any data processing service can be obtained. The fusion result is generated by any data processing service after fusing the processing results of each data processing service. When it is determined that the task corresponding to the task ID is completed, the fusion result is determined to be the federated computing result corresponding to the task ID. When it is determined that the task corresponding to the task ID is not completed, the fusion result is sent to any data processing service, so that each data processing service can continue to process the corresponding data set based on the fusion result until it is determined that the task corresponding to the task ID is completed. The latest fusion result is determined as the federated computing result corresponding to the task ID. Therefore, by setting the end for the federated computing task, the situation of invalid calculation of the task is avoided as far as possible, and the speed of federated computing is further improved, while ensuring the accuracy of the final federated computing result.

Figure 8:
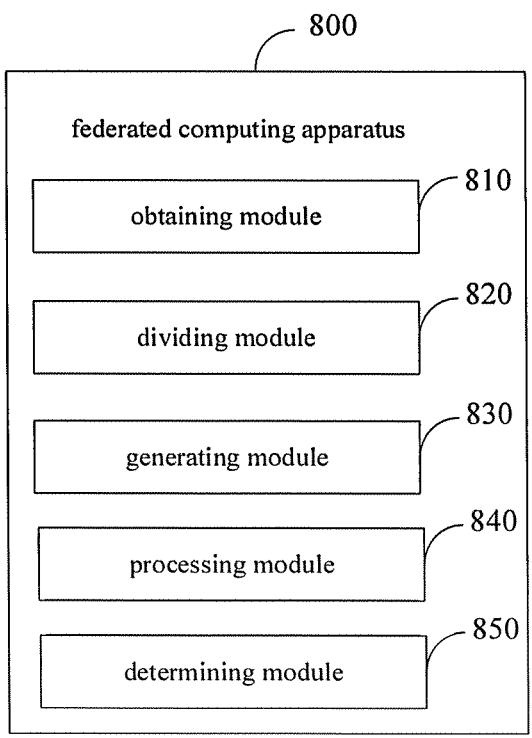
FIG. 8 is a structure diagram of a federated computing apparatus according to the embodiments of the disclosure.

In order to realize the above embodiments, the embodiments of the disclosure also provides a federated computing apparatus. FIG. 8 is a structure diagram of a federated computing apparatus according to the embodiments of the disclosure.

As illustrated in FIG. 8, the federated computing apparatus includes: an obtaining module 810, a dividing module 820, a generating module 830, a processing module 840 and a determining module 850.

The obtaining module is configured to obtain metadata to be processed from each participant based on a task ID to be executed.

The dividing module is configured to obtain n data slices corresponding to each participant by dividing the metadata, in which n is a positive integer greater than 1.

The generating module is configured to generate n data sets based on the n data slices corresponding to each participant.

The processing module is configured to call n data processing services corresponding to the task ID to process each data set using each of the data processing services.

The determining module is configured to determine a federated computing result corresponding to the task ID based on a processing result of each of the data processing services.

In a possible implementation, the dividing module 820 is further configured to:

determine a data dividing mode based on the task ID to be executed; and obtain the n data slices corresponding to each participant by dividing the metadata based on the data dividing mode.

In a possible implementation, the determining module 850 is further configured to:

obtain the processing result returned by each of the data processing services;

obtain a fusion result by fusing the n processing results; and determine the fusion result as the federated computing result corresponding to the task ID in response to determining that a task corresponding to the task ID is completed.

In a possible implementation, the determining module 850 is further configured to:

distribute the fusion result to the n data processing services, in response to determining that the task corresponding to the task ID is not completed;

continue to process the data sets based on the fusion result by each of the data processing services until it is determined that the task corresponding to the task ID is completed; and determine the federated computing result corresponding to the task ID based on the latest n processing results.

In a possible implementation, the determining module 850 is further configured to:

obtain the fusion result returned by any one of the data processing services, in which the fusion result is generated after any one of the data processing services fuses the processing results of each of the data processing services;

determine the fusion result as the federated computing result corresponding to the task ID in response to determining that a task corresponding to the task ID is completed;

send the fusion result to any one of the data processing services, in response to determining that the task corresponding to the task ID is not completed;

continue to process the data sets based on the fusion result by each of the data processing services until it is determined that the task corresponding to the task ID is completed; and determine the latest fusion result as the federated computing result corresponding to the task ID.

In a possible implementation, the determining module 850 is further configured to:

send the federated computing result to each participant.

It should be noted that the above explanation of the federated computing method is also applicable to the federated computing apparatus, which will not be repeated here.

With the federated computing apparatus of the embodiments of the disclosure, the metadata to be processed is obtained from each participant based on the task ID to be executed. The n data slices corresponding to each participant are obtained by dividing the metadata. The n data sets are generated based on the n data slices corresponding to each participant. The n data processing services corresponding to the task ID are called to process each data set using each of the data processing services. Finally, the federated computing result corresponding to the task ID is determined based on the processing result of each of the data processing services. Data parallelism is adopted in the process of federated computing. Firstly, the n data slices corresponding to each participant are combined to generate the data set, and then each data set is processed by each of the data processing services, to obtain the federated computing result. Therefore, the parallelization of FL is realized, which improves the computing speed and provides technical feasibility for the use of large-scale data privacy computing.

According to the embodiments of the disclosure, the disclosure also provides an electronic device, a readable storage medium and a computer program product.

Figure 9:
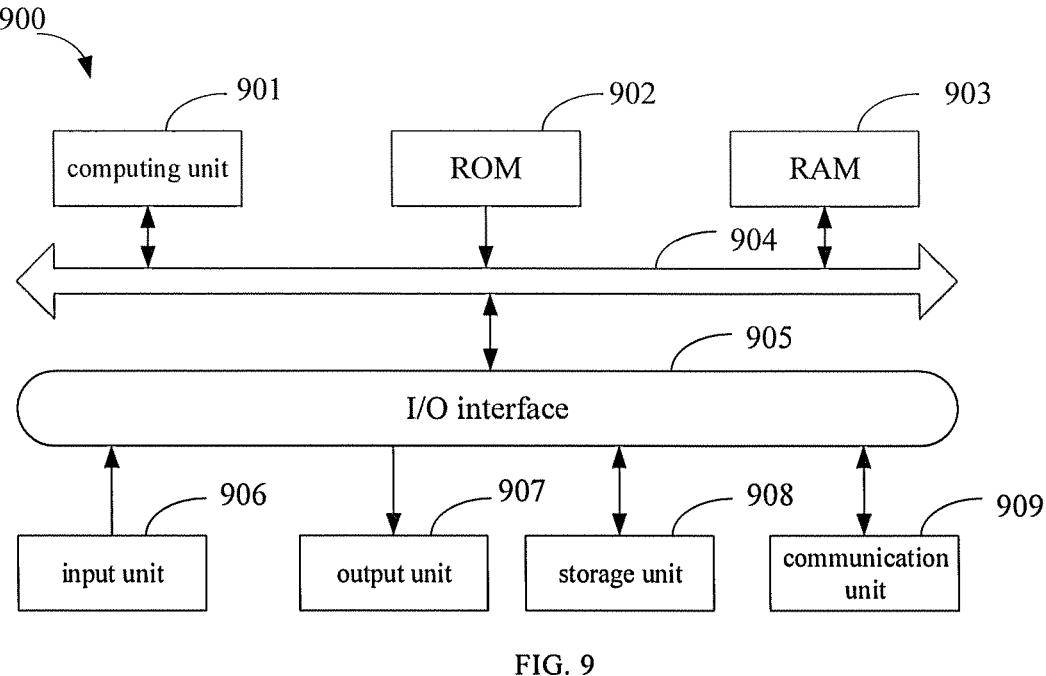
FIG. 9 is a block diagram of an electronic device for implementing a federated computing method according to the embodiments of the disclosure.

FIG. 9 is a block diagram of an example electronic device 900 for implementing the embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 9, the device 900 includes a computing unit 901 performing various appropriate actions and processes based on computer programs stored in a read-only memory (ROM) 902 or computer programs loaded from the storage unit 908 to a random access memory (RAM) 903. In the RAM 903, various programs and data required for the operation of the device 900 are stored. The computing unit 901, the ROM 902, and the RAM 903 are connected to each other through a bus 904. An input/output (I/O) interface 905 is also connected to the bus 904.

Components in the device 900 are connected to the I/O interface 905, including: an inputting unit 906, such as a keyboard, a mouse; an outputting unit 907, such as various types of displays, speakers; a storage unit 908, such as a disk, an optical disk; and a communication unit 909, such as network cards, modems, and wireless communication transceivers. The communication unit 909 allows the device 900 to exchange information/data with other devices through a computer network such as the Internet and/or various telecommunication networks.

The computing unit 901 may be various general-purpose and/or dedicated processing components with processing and computing capabilities. Some examples of computing unit 901 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 901 executes the various methods and processes described above, such as the federated computing method. For example, in some embodiments, the federated computing method may be implemented as a computer software program, which is tangibly contained in a machine-readable medium, such as the storage unit 908. In some embodiments, part or all of the computer program may be loaded and/or installed on the device 900 via the ROM 902 and/or the communication unit 909. When the computer program is loaded on the RAM 903 and executed by the computing unit 901, one or more steps of the federated computing method described above may be executed. Alternatively, in other embodiments, the computing unit 901 may be configured to perform the federated computing method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, also known as a cloud computing server or a cloud host, which is a host product in the cloud computing service system, to solve the defects of difficult management and weak business scalability in the traditional physical host and virtual private server (VPS) service. The server can also be a server of distributed system or a server combined with block-chain.

According to an embodiment of the disclosure, the disclosure also provides a computer program product having instructions stored thereon, when the instructions are executed by a processor, the federated computing method of the above embodiments of the disclosure is implemented.

The technical solution of the embodiment of the disclosure relates to the technical fields of big data, cloud computing and deep learning. Data parallelism is adopted in the process of federated computing. Firstly, the n data slices corresponding to each participant are combined to generate the data set, and then each data set is processed by each of the data processing services, to obtain the federated computing result. Therefore, in the process of federated computing, the parallelization of FL is realized by using data parallelism, which greatly improves the speed of federated computing and provides technical feasibility for the use of large-scale data privacy computing.

It should be understood that the various forms of processes shown above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

What is claimed is:

1. A metadata processing method based on federated computing, comprising:

obtaining metadata to be processed from each participant in the federated computing based on a task identifier (ID) to be executed;

obtaining n data slices corresponding to each participant by dividing the metadata, wherein n is a positive integer greater than 1;

generating n data sets based on the n data slices corresponding to each participant;

calling n data processing services corresponding to the task ID to process each data set using each of the data processing services to obtain a federated computing processing result of each of the data processing services; and determining a federated computing result corresponding to the task ID based on the processing result of each of the data processing services.

2. The method of claim 1, wherein obtaining the n data slices corresponding to each participant by dividing the metadata, comprises:

determining a data dividing mode based on the task ID to be executed; and obtaining the n data slices corresponding to each participant by dividing the metadata based on the data dividing mode.

3. The method of claim 1, wherein determining the federated computing result corresponding to the task ID based on the processing result of each of the data processing services comprises:

obtaining the processing result returned by each of the data processing services;

obtaining a fusion result by fusing the n processing results; and determining the fusion result as the federated computing result corresponding to the task ID in response to determining that a task corresponding to the task ID is completed.

4. The method of claim 3, further comprising:

distributing the fusion result to the n data processing services, in response to determining that the task corresponding to the task ID is not completed;

continuing to process the data sets based on the fusion result by each of the data processing services until it is determined that the task corresponding to the task ID is completed; and determining the federated computing result corresponding to the task ID based on the latest n processing results.

5. The method of claim 1, wherein determining the federated computing result corresponding to the task ID based on the processing result of each of the data processing services comprises:

obtaining the fusion result returned by any one of the data processing services, wherein the fusion result is generated after any one of the data processing services fuses the processing result of each of the data processing services;

determining the fusion result as the federated computing result corresponding to the task ID in response to determining that a task corresponding to the task ID is completed;

sending the fusion result to any one of the data processing services, in response to determining that the task corresponding to the task ID is not completed;

continuing to process the data sets based on the fusion result by each of the data processing services until it is determined that the task corresponding to the task ID is completed; and determining the latest fusion result as the federated computing result corresponding to the task ID.

6. The method of claim 1, further comprising:

sending the federated computing result to each participant.

7. An electronic device, comprising:

at least one processor; and a memory communicatively coupled to the at least one processor; wherein, the memory stores instructions executable by the at least one processor, when the instructions are executed by the at least one processor, the at least one processor is enabled to implement a metadata processing method based on federated computing, the method comprising:

obtaining metadata to be processed from each participant in the federated computing based on a task identifier (ID) to be executed;

obtaining n data slices corresponding to each participant by dividing the metadata, wherein n is a positive integer greater than 1;

generating n data sets based on the n data slices corresponding to each participant;

calling n data processing services corresponding to the task ID to process each data set using each of the data processing services to obtain a federated computing processing result of each of the data processing services; and determining a federated computing result corresponding to the task ID based on the processing result of each of the data processing services.

8. A non-transitory computer-readable storage medium having computer instructions stored thereon, wherein the computer instructions are configured to cause a computer to implement a metadata processing method based on federated computing, the method comprising:

obtaining metadata to be processed from each participant in the federated computing based on a task identifier (ID) to be executed;

obtaining n data slices corresponding to each participant by dividing the metadata, wherein n is a positive integer greater than 1;

generating n data sets based on the n data slices corresponding to each participant;

calling n data processing services corresponding to the task ID to process each data set using each of the data processing services to obtain a federated computing processing result of each of the data processing services; and determining a federated computing result corresponding to the task ID based on the processing result of each of the data processing services.

9. The method of claim 2, further comprising: sending the federated computing result to each participant.

10. The method of claim 3, further comprising: sending the federated computing result to each participant.

11. The device of claim 7, wherein obtaining the n data slices corresponding to each participant by dividing the metadata, comprises:

determining a data dividing mode based on the task ID to be executed; and obtaining the n data slices corresponding to each participant by dividing the metadata based on the data dividing mode.

12. The device of claim 7, wherein determining the federated computing result corresponding to the task ID based on the processing result of each of the data processing services comprises:

obtaining the processing result returned by each of the data processing services;

obtaining a fusion result by fusing the n processing results; and determining the fusion result as the federated computing result corresponding to the task ID in response to determining that a task corresponding to the task ID is completed.

13. The device of claim 12, wherein the at least one processor is further configured to perform the following:

distributing the fusion result to the n data processing services, in response to determining that the task corresponding to the task ID is not completed;

continuing to process the data sets based on the fusion result by each of the data processing services until it is determined that the task corresponding to the task ID is completed; and determining the federated computing result corresponding to the task ID based on the latest n processing results.

14. The device of claim 7, wherein determining the federated computing result corresponding to the task ID based on the processing result of each of the data processing services comprises:

obtaining the fusion result returned by any one of the data processing services, wherein the fusion result is generated after any one of the data processing services fuses the processing result of each of the data processing services;

determining the fusion result as the federated computing result corresponding to the task ID in response to determining that a task corresponding to the task ID is completed;

sending the fusion result to any one of the data processing services, in response to determining that the task corresponding to the task ID is not completed;

continuing to process the data sets based on the fusion result by each of the data processing services until it is determined that the task corresponding to the task ID is completed; and determining the latest fusion result as the federated computing result corresponding to the task ID.

15. The device of claim 7, wherein the at least one processor is further configured to perform the following:

sending the federated computing result to each participant.

16. The storage medium of claim 8, wherein obtaining the n data slices corresponding to each participant by dividing the metadata, comprises:

determining a data dividing mode based on the task ID to be executed; and obtaining the n data slices corresponding to each participant by dividing the metadata based on the data dividing mode.

17. The storage medium of claim 8, wherein determining the federated computing result corresponding to the task ID based on the processing result of each of the data processing services comprises:

obtaining the processing result returned by each of the data processing services;

obtaining a fusion result by fusing the n processing results; and determining the fusion result as the federated computing result corresponding to the task ID in response to determining that a task corresponding to the task ID is completed.

18. The storage medium of claim 17, wherein the computer instructions are configured to cause the computer to perform the following:

distributing the fusion result to the n data processing services, in response to determining that the task corresponding to the task ID is not completed;

continuing to process the data sets based on the fusion result by each of the data processing services until it is determined that the task corresponding to the task ID is completed; and determining the federated computing result corresponding to the task ID based on the latest n processing results.

19. The storage medium of claim 8, wherein determining the federated computing result corresponding to the task ID based on the processing result of each of the data processing services comprises:

obtaining the fusion result returned by any one of the data processing services, wherein the fusion result is generated after any one of the data processing services fuses the processing result of each of the data processing services;

determining the fusion result as the federated computing result corresponding to the task ID in response to determining that a task corresponding to the task ID is completed;

sending the fusion result to any one of the data processing services, in response to determining that the task corresponding to the task ID is not completed;

continuing to process the data sets based on the fusion result by each of the data processing services until it is determined that the task corresponding to the task ID is completed; and determining the latest fusion result as the federated computing result corresponding to the task ID.

20. The storage medium of claim 8, wherein the computer instructions are configured to cause the computer to perform the following: sending the federated computing result to each participant.

* * * * *